United States Patent
Tamura (10) Patent No.: US 10,432,053 B2
(45) Date of Patent: Oct. 1, 2019

(54) STATOR FOR ROTATING ELECTRICAL MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 409 days.

(21) Appl. No.: 14/163,412

(22) Filed: Jan. 24, 2014

(65) Prior Publication Data

US 2014/0210304 A1    Jul. 31, 2014

(30) Foreign Application Priority Data

Jan. 25, 2013 (JP) ................. 2013-012323

(51) Int. Cl.
  *H02K 3/34* (2006.01)
  *H02K 3/32* (2006.01)

(52) U.S. Cl.
  CPC ............ *H02K 3/345* (2013.01); *H02K 3/32* (2013.01); *H02K 3/34* (2013.01)

(58) Field of Classification Search
  CPC ............ H02K 3/34; H02K 3/345; H02K 3/28; H02K 3/30; H02K 3/32; H02K 3/325; H02K 3/40
  USPC ........ 310/214, 215, 216.069, 43, 45
  See application file for complete search history.

(56) References Cited

U.S. PATENT DOCUMENTS

| | | | | |
|---|---|---|---|---|
| 4,780,636 A * | 10/1988 | Gandhi | ............... | H02K 1/165 310/214 |
| 6,242,836 B1 | 6/2001 | Ishida et al. | | |
| 6,972,506 B2 * | 12/2005 | Onishi | ............... | H02K 3/345 310/215 |
| 2003/0127936 A1 * | 7/2003 | Katou | ............... | H02K 3/345 310/215 |
| 2004/0189134 A1 | 9/2004 | Onishi | | |

(Continued)

FOREIGN PATENT DOCUMENTS

| | | |
|---|---|---|
| JP | 3899685 | 1/2007 |
| JP | 2008-289284 | 11/2008 |

OTHER PUBLICATIONS

English abstract for JP2012249398; Dec. 2012; Japan; Kurahara et al.*

*Primary Examiner* — Julio C. Gonzalez
*Assistant Examiner* — Ahmed Elnakib
(74) *Attorney, Agent, or Firm* — Nixon & Vanderhye P.C.

(57) ABSTRACT

A stator includes an annular stator core, a stator winding, and an insulating sheet member. In the stator core, slots are circumferentially arrayed. The stator winding includes conductor segments having oblique portions formed by open end portions being circumferentially twisted. The open end portions are inserted into the slots from one of two axial-direction sides and extend towards another one. The insulating sheet member is interposed between an inner wall surface of the slot and the conductor segment. The insulating sheet member is rolled into a cylindrical shape along the inner wall surface of the slot, and includes an overlapping portion and a slack portion. In the overlapping portion, two circumferential-direction end portions overlap each other. The overlapping portion is disposed on one of two radial-direction sides of each of the slots. The slack portion is disposed on another one of two radial-direction sides of each of the slots.

29 Claims, 8 Drawing Sheets

(56) References Cited

U.S. PATENT DOCUMENTS

| | | | | |
|---|---|---|---|---|
| 2004/0256943 A1* | 12/2004 | Omura | ................ | H02K 3/345 |
| | | | | 310/215 |
| 2012/0025646 A1* | 2/2012 | Sheeran | ................ | H02K 3/30 |
| | | | | 310/88 |
| 2014/0084713 A1* | 3/2014 | Kurahara | ............... | H02K 3/30 |
| | | | | 310/45 |

* cited by examiner

STATOR FOR ROTATING ELECTRICAL MACHINE

CROSS-REFERENCE TO RELATED APPLICATION

This application is based on and claims the benefit of priority from earlier Japanese Patent Application No. 2013-12323 filed Jan. 25, 2013, the description of which is incorporated herein by reference.

BACKGROUND

Technical Field

The present invention relates to a stator for a rotating electrical machine that is mounted in a vehicle or the like and used as an electric motor or a power generator.

Related Art

In related art, a rotating electrical machine that includes a rotor, a stator core, and a stator winding is generally known as a rotating electrical machine that is mounted and used in a vehicle. The rotor is provided in a rotatable manner. The stator core is disposed such as to oppose the rotor in a radial direction. The stator core has a plurality of slots that are arrayed in a circumferential direction. The stator winding is wound around the slots in the stator core.

JP-B-3899685 discloses a stator winding that is configured by a plurality of conductor segments that are each formed into a substantially U-shape. The terminals of the conductor segments are connected to one another. The stator winding is wound around a stator core by open end portions of the plurality of conductor segments being inserted into the slots from one axial-direction side. The open end portions extend towards the other axial-direction end side. The open end portions are then twisted in a circumferential direction, thereby forming oblique portions. The terminals of the oblique portions of differing conductor segments are joined with one another by welding or the like.

In addition, JP-B-3899685 discloses an insulating sheet member that is interposed between an inner wall surface of the slot and the conductor segment. The insulating sheet member is disposed in a state in which both axial-direction end portions project from the axial-direction end surface of the stator core, such as to set an allowance (creepage distance) from the axial-direction end surface of the stator core. This is to ensure electrical insulation (insulation to the earth) between the stator core and the stator winding.

As in the above-described stator disclosed in JP-B-3899685, the stator winding is formed by the plurality of conductor segments being joined together. In the stator winding, the open end portions extend from the slots toward the other axial-direction end side. A straight portion and the oblique portion are present at the base of the twist in the open end portion. The straight portion extends in the axial direction. The oblique portion slants in the circumferential direction from the tip of the straight portion. Therefore, to achieve size reduction by reducing the projection height of a coil end portion of the stator winding, the straight portions of the open end portions that extend from the slots are required to be made smaller. The coil end portion of the stator winding projects outward in the axial direction from the axial-direction end surface of the stator core. The straight portions extend in the axial direction.

However, in an instance in which the straight portion is made smaller, stretching stress applied to the end portion of the insulating sheet member that projects from the axial-direction end surface of the stator core increases, when the open end portion extending from the slot towards the other axial-direction end side is twisted in the circumferential direction. Therefore, tearing in the end portion of the insulating sheet member occurs more easily. When tearing occurs in the insulating sheet member in this way, the creepage distance becomes insufficient. The possibility of an insulation defect, such as creepage discharge, increases. Sufficient insulation cannot be ensured.

SUMMARY

It is thus desired to provide a stator for a rotating electrical machine capable of preventing tearing from occurring in an insulating sheet member disposed in a slot of a stator core, while actualizing size reduction of a stator winding.

According to an exemplary embodiment of the present disclosure, there is provided a stator for a rotating electrical machine. The stator includes: an annular stator core, a stator winding, and an insulating sheet member. In the annular stator core, a plurality of slots are formed to be arrayed in a circumferential direction of the stator core. The stator winding includes a plurality of conductor segments having oblique portions formed by open end portions being twisted in the circumferential direction. The open end portions are inserted into the slots from one axial-direction side, and extend towards the other axial-direction side. Terminals of the oblique portions are joined to one another. The insulating sheet member is interposed between an inner wall surface of each of the slots and the conductor segment.

In the stator, the insulating sheet member is rolled into a cylindrical shape along the inner wall surface of each of the slots. The insulating sheet member has an overlapping portion and a slack portion. In the overlapping portion, both circumferential-direction end portions overlap each other. The overlapping portion is disposed on one of two radial-direction sides of each of the slots in a radial direction of the stator core. The slack portion is disposed on another one of the two radial-direction sides of each of the slots in the radial direction.

In the exemplary embodiment, the insulating sheet member is rolled into a cylindrical shape along the inner wall surface of the slot. The insulating sheet member has the overlapping portion in which both circumferential-direction end portions overlap each other. The slack portion is provided on the side opposite to the overlapping portion in the radial direction. Therefore, when the open end portions of the conductor segment extending from the slot towards the other axial-direction end side are twisted, the slack portion of the insulating sheet member extends in the circumferential direction. Therefore, stretching stress in the circumferential direction that is applied to an axial-direction end portion of the insulating sheet member that projects from the axial-direction end surface of the stator core can be relaxed. As a result, tearing of the insulating sheet member can be prevented from occurring.

In addition, in the exemplary embodiment, a straight portion that is present at the base of the twist in the open end portion extending from the slot towards the other axial-direction end side and that extends in the axial direction can be made smaller. Therefore, size reduction of the stator winding can be actualized.

The insulating sheet member is rolled into a cylindrical shape. In the overlapping portion, both circumferential-direction end portions of the insulating sheet member overlap each other. In the overlapping portion, when the open end portions of the conductor segment extending from the slot towards the other axial-direction end side are twisted, stretching stress in the in the circumferential direction is not applied to the axial-direction end portion of the insulating sheet member that projects from the axial-direction end surface of the stator core is not applied in the overlapping portion. Therefore, tearing of the insulating sheet member does not occur.

DESCRIPTION OF EMBODIMENTS

Embodiments of a rotating electrical machine of the present invention will hereinafter be described in detail with reference to the drawings.

First Embodiment

Figure 1:
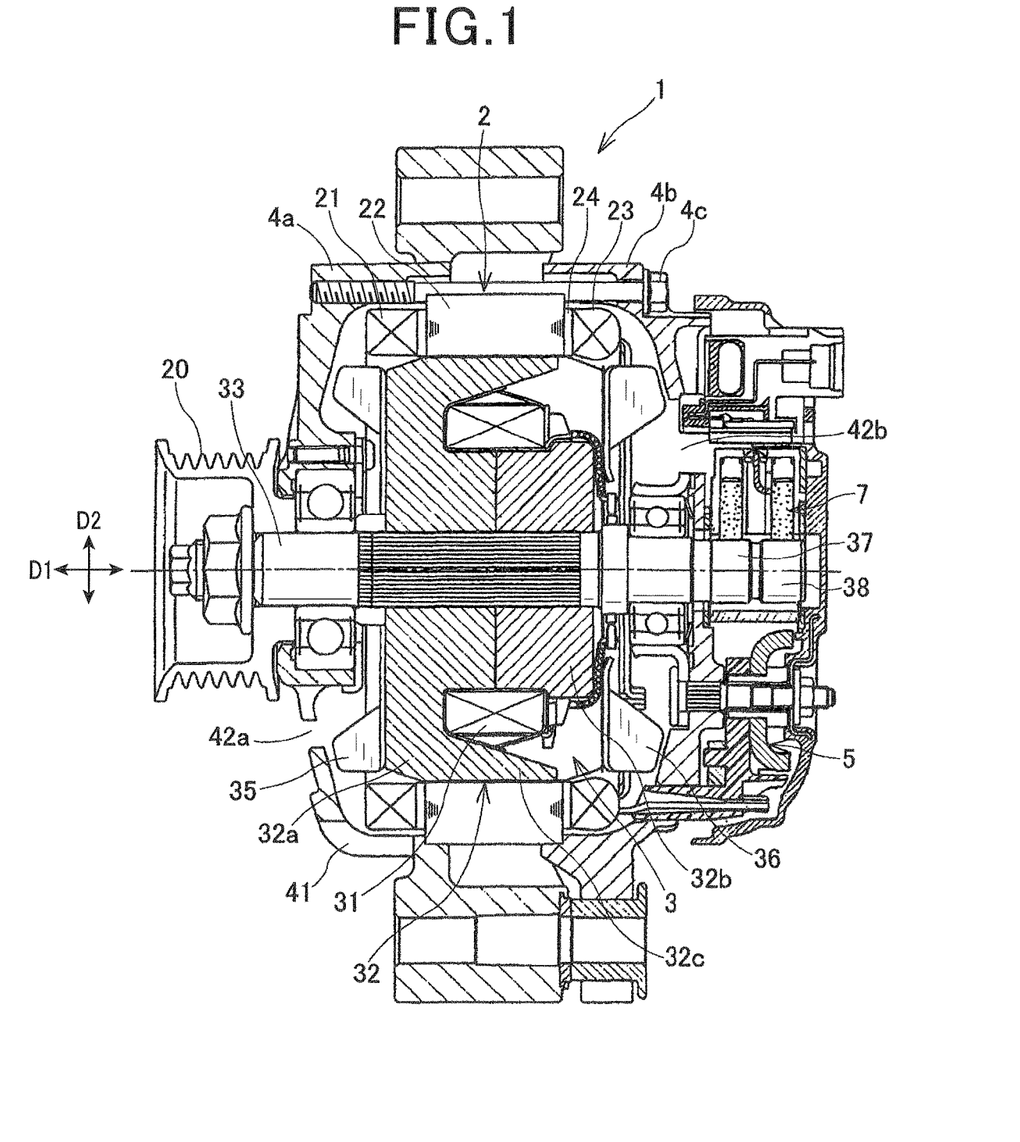
FIG. 1 is an axial-direction cross-sectional view of a rotating electrical machine according to a first embodiment.

A rotating electrical machine 1 according to a first embodiment is used as an alternating current (AC) generator (alternator) for a vehicle. As shown in FIG. 1, the rotating electrical machine 1 includes a stator 2, a rotor 3, a front housing 4a, a rear housing 4b, a rectifier 5, and the like. The stator 2 operates as an armature. The rotor 3 operates as a field system. The front housing 4a and the rear housing 4b house the stator 2 and the rotor 3. The front housing 4a and the rear housing 4b are connected and fixed to each other by a fastening bolt 4c. The rectifier 5 converts alternating-current power to direct-current power.

Figure 2:
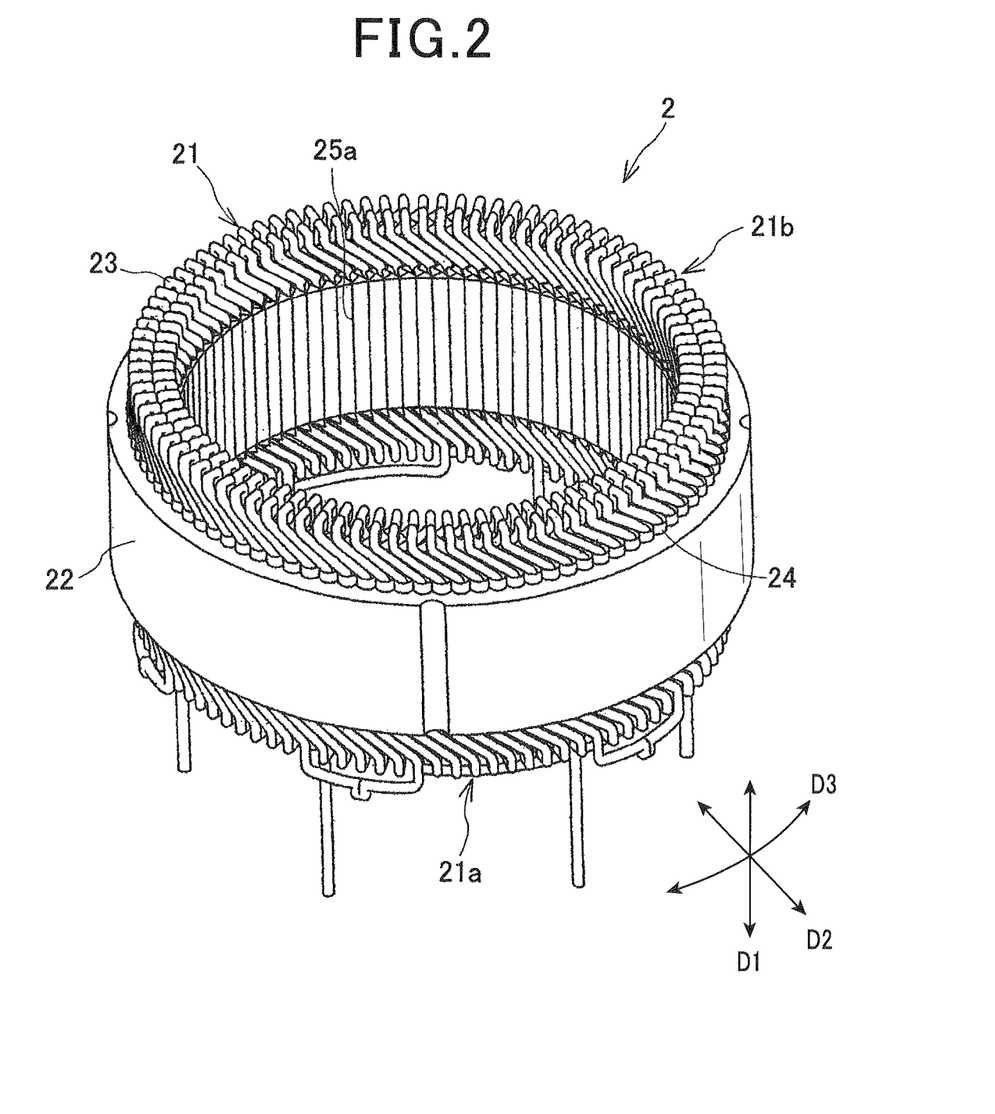
FIG. 2 is an overall perspective view of a stator according to the first embodiment.

As shown in FIG. 2, the stator 2 includes a stator core 22, a segment-type stator winding 21, and an insulating sheet member 24. The stator winding 21 is configured by a plurality of conductor segments 23. The insulating sheet member 24 provides electrical insulation between the stator core 22 and the stator winding 21. The stator 2 is fixed by being sandwiched between the front housing 4a and the rear housing 4b. The stator 2 is disposed on the outer-circumference side of the rotor 3 with a predetermined air gap G (see FIG. 5) therebetween. A detailed structure of the stator 2 will be described hereafter.

As shown in FIG. 1, the rotor 3 rotates integrally with a shaft (rotary shaft) 33 disposed in the rotating electrical machine 1. The shaft 33 is rotatably supported by the front housing 4a and the rear housing 4b. The rotor 3 includes a Lundell-type pole core 32 and a field winding 31. A pulley 20 is fixed to a front end portion of the shaft 33. The pulley 20 is connected by a belt or the like (not shown) to an engine (not shown) for travelling, the engine being mounted in an own vehicle.

The Lundell-type pole core 32 is configured by a combination of a pair of pole cores that are a front pole core 32a and a rear pole core 32b. The pole cores 32a and 32b each have six tab-shaped magnetic pole portions 32c. The pole cores 32a and 32b are fitted onto the shaft 33 such as to sandwich the field winding 31 from the front and the back. The field winding 31 is configured by an insulation-processed copper wire being concentrically wound into a circular cylindrical shape. According to the first embodiment, the pole cores 32a and 32b each have eight magnetic poles. In other words, a 16-pole rotor 3 is formed.

Intake holes 42a and 42b are respectively provided in an axial-direction end surface (front end surface) of the front housing 4a and an axial-direction end surface (rear end surface) of the rear housing 4b. A diagonal flow fan 35 is fixed to a front end surface of the front pole core 32a by welding or the like. Cooling air is taken in from the front intake hole 42a. The diagonal flow fan 35 is then used to blow the cooling air in the axial direction D1 and the radial direction D2. In a similar manner, a centrifugal fan 36 is fixed to a rear end surface of the rear pole core 32b by welding or the like. Cooling air is taken in from the rear intake hole 42b. The centrifugal fan 36 is then used to blow the cooling air in the radial direction D2. In addition, the front housing 4a and the rear housing 4b are each provided with an outlet hole 41 for the cooling air. The outlet hole 41 is provided in sections opposing the coil end portions of the stator winding 21 projecting from both axial-direction ends of the stator core 22.

Slip rings 37 and 38 are formed in a rear end portion of the shaft 33. The slip rings 37 and 38 are electrically connected to respective ends of the field winding 31. Power is supplied from a brush device 7 to the field winding 31 via the slip rings 37 and 38.

In the rotating electrical machine 1 configured as described above, rotational force from an engine is transmitted to the pulley 20 by a belt or the like. The rotor 3 then rotates in a predetermined direction together with the shaft 33. In this state, excitation voltage is applied to the field winding 31 of the rotor 3 from the brush device 7 via the slip rings 37 and 38. As a result, the tab-shaped magnetic pole portions 32c of the pole cores 32a and 32b become magnetized. NS magnetic poles are alternately formed along the rotational circumferential direction of the rotor 3. As a result, three-phase alternating-current voltage can be generated at the stator winding 21. A predetermined direct current can be taken out from an output terminal of the rectifier 5.

Next, details of the stator 2 will be described with reference to FIG. 2 to FIG. 7. The stator core 22 is formed by a plurality of annular electromagnetic steel plates being stacked in the axial direction D1. The stator core 22 has an annular back core portion 22a and a plurality of teeth portions 22b. The back core portion 22a configures an outer circumferential portion of the stator core 22. The teeth portions 22b are arrayed a predetermined distance apart in the circumferential direction D3, and project inward in the radial direction D2 from the back core portion 22a.

Figure 5:
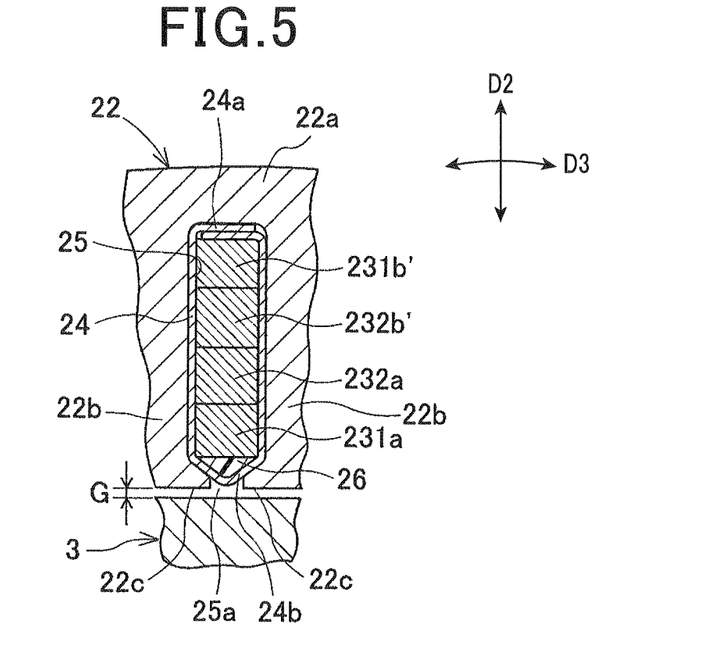
FIG. 5 is a partial cross-sectional view of the stator according to the first embodiment.
Figure 6:
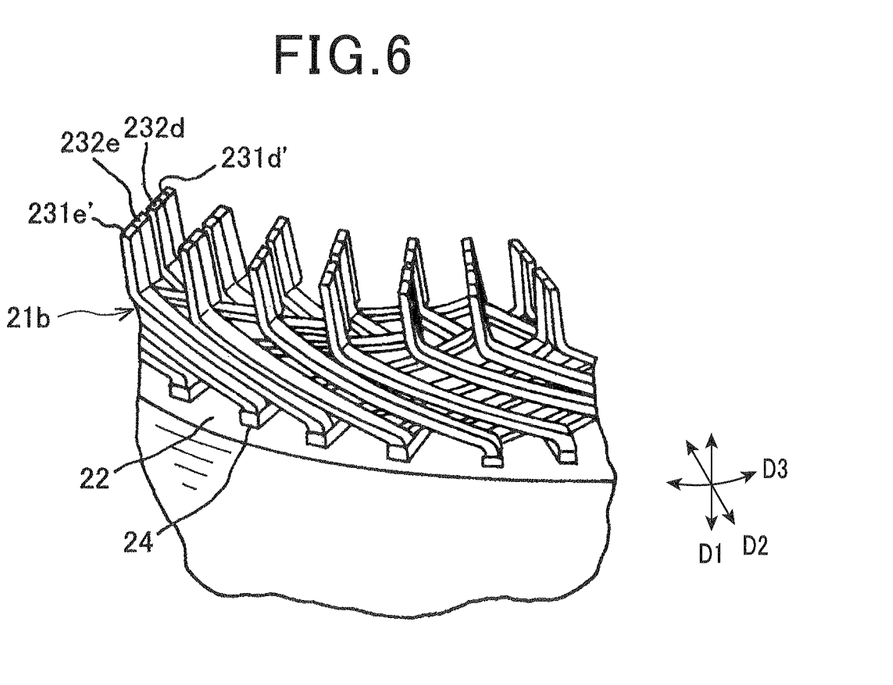
FIG. 6 is a perspective view showing some joined-side end portions of the stator according to the first embodiment.

A slot 25 is formed between two adjacent teeth portions 22b of the stator core 22. The slot 25 passes through the stator core 22 in the axial direction D1 and is capable of housing the multiple-phase stator winding 21. According to the first embodiment, 96 slots 25 are disposed evenly spaced in the circumferential direction D3. The 96 slots 25 allow two sets of three-phase stator windings 21 to be housed, such as to correspond to the number of magnetic poles of the rotor 3. In this instance, the number of magnetic poles is 16 poles. A flange portion 22c is formed at the projecting tip of each of the two teeth portions 22b demarcating the slot 25. The flange portions 22c oppose each other with a predetermined distance therebetween in the circumferential direction D3. The flange portion 22c is formed into a tapered shape such that the radial-direction width gradually decreases towards the projecting tip. As a result, a slit-shaped opening 25a is formed between the pair of flange portions 22c and 22c that oppose each other on the inner-diameter side of the slot 25. The opening 25a opens on the inner circumferential surface of the stator core 22 and extends in the axial direction D1.

The stator winding 21 is mounted in the slots 25 of the stator core 22. The stator winding 21 is configured by a plurality of substantially U-shaped conductor segments 23. Respective joined end portions 23f of the conductor segments 23 are joined with one another (see FIG. 4). Each conductor segment 23 is formed by a rectangular wire having a rectangular cross-section. The rectangular wire is composed of a conductor portion and an insulating film. The conductor portion is formed by a metal material such as copper. The insulating film covers the outer-circumferential surface of the conductor portion. The joined end portion 23f is in a state in which the insulating film is peeled, exposing the conductor portion within.

Figure 3:
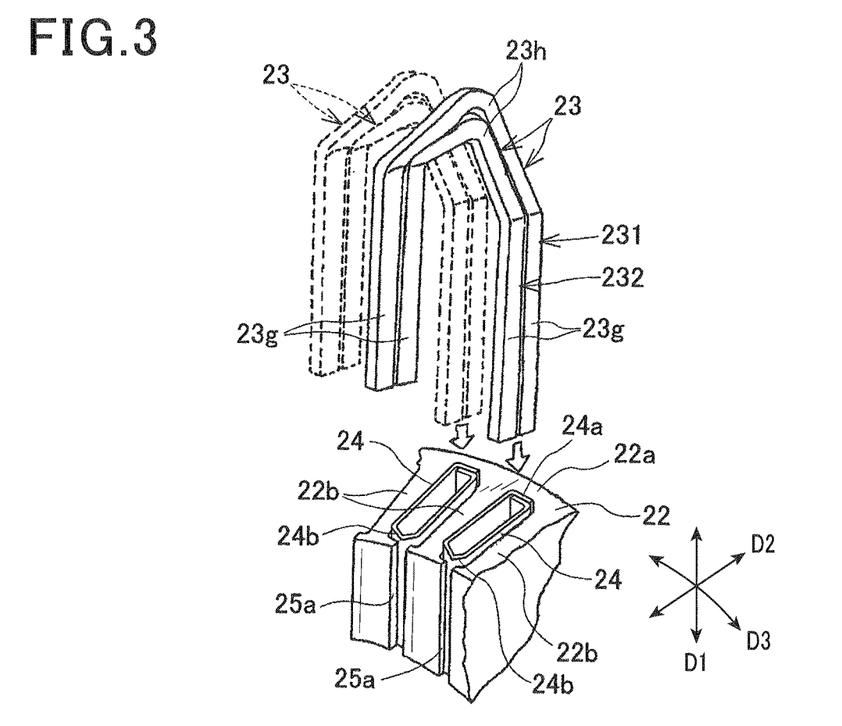
FIG. 3 is an explanatory diagram showing a state in which conductor segments are inserted into slots of a stator core according to the first embodiment.

As shown in FIG. 3, the U-shaped conductor segment 23 is used. The conductor segment 23 is composed of a pair of straight portions 23g and 23g, and a turn portion 23h. The turn portion 23h connects one end portion of one straight portion 23g to one end portion of the other straight portion 23g. The pair of straight portions 23g and 23g of the conductor segment 23 are inserted into two slots 25 from one axial-direction side. The two slots 25 are apart from each other by a predetermined slot pitch. After insertion, open end portions of the straight portions 23g and 23g are bent such as to slant at a predetermined angle to either circumferential-direction side. The open end portions of the straight portions 23g and 23g extend outside of the slots 25 to the other axial-direction side.

Figure 4:
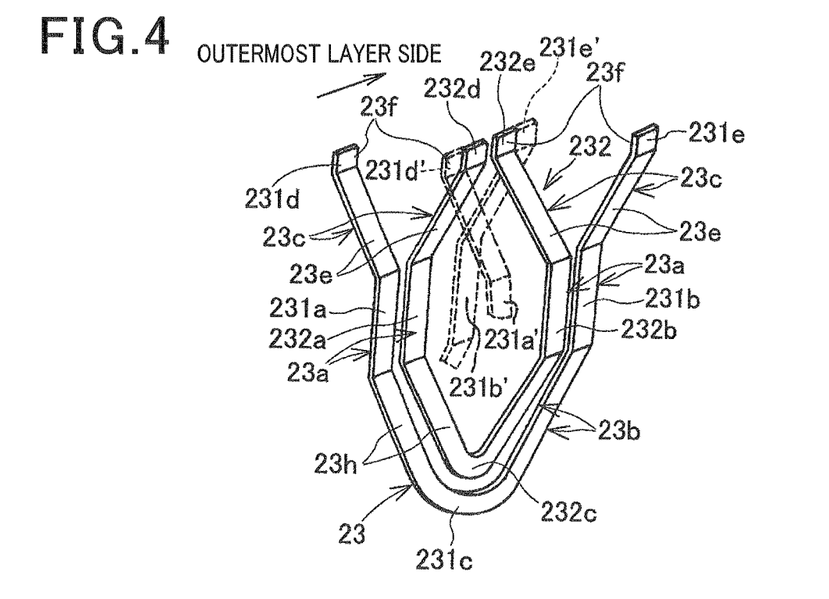
FIG. 4 is a schematic perspective view of the conductor segments used according to the first embodiment.

As a result, as shown in FIG. 4, the conductor segment 23 has a pair of slot-housed portions 23a and 23a and a coil end portion. The slot-housed portions 23a and 23a are housed within the slots 25 and extend straight along the axial direction D1. The coil end portions are exposed on both axial-direction sides from the slots 25 and extend in the circumferential direction D3. The coil end portion is composed of a turn-side end portion 23b and a pair of joined-side end portions 23c and 23c.

The turn-side end portion 23b is provided integrally with the slot-housed portions 23a such as to connect the ends of both slot-housed portions 23a. The turn-side end portion 23b also projects from one axial-direction end side of the slot 25 (the rear side of the rotating electrical machine 1 and the right side in FIG. 1; the same applies hereafter).

The joined-side end portions 23c and 23c are each integrally provided on the other end of each slot-housed portion 23a and 23a. The joined-side end portions 23c and 23c also project from the other axial-direction end side of the slot (the front side of the rotating electrical machine 1 and the left side in FIG. 1; the same applies hereafter).

The turn-side end portion 23b has a substantially V-shaped turn portion 23h at the tip. The turn portion 23h is formed by curving deformation. On the other hand, the joined-side end portion 23c has an oblique portion 23e and the joined end portion 23f. The oblique portion 23e is twisted in the circumferential direction D3 such as to slant at a predetermined angle in relation to the axial-direction end surface of the stator core 22. The joined end portion 23f is integrally formed at the tip of the oblique portion 23e by bending deformation.

Each slot 25 of the stator core 22 houses an even number (four according to the first embodiment) of electrical conductors (the slot-housed portions 23a of the conductor segments 23). As shown in FIG. 5, the four electrical conductors within the single slot 25 are arrayed in a single row along the radial direction D2. The four electrical conductors compose, in order from the inner side, an inner end layer, an inner middle layer, an outer middle layer, and an outer end layer. The electrical conductors housed within the slot 25 are connected in a predetermined pattern, thereby forming the stator winding 21. The four electrical conductors within the single slot 25 form the stator winding 21 of the same phase.

The electrical conductors within the slot 25 are electrically connected via the turn portion 23h at the turn-side end portion 23b on the one axial-direction end side. As a result, a first coil end group 21a is formed on the one axial-direction end side of the stator core 22 (see FIG. 2). The first coil end group 21a is formed by the numerous turn portions 23h projecting from the slots 25. In addition, the joined end portions 23f are electrically connected by being joined to one another by arc welding, at the joined-side end portion 23c on the other axial-direction end side. As a result, a second coil end group 21b is formed on the other axial-direction end side of the stator core 22 (see FIG. 2 and FIG. 6). The second coil end group 21b is formed by the numerous joined-side end portions 23c projecting from the slots 25.

Figure 7:
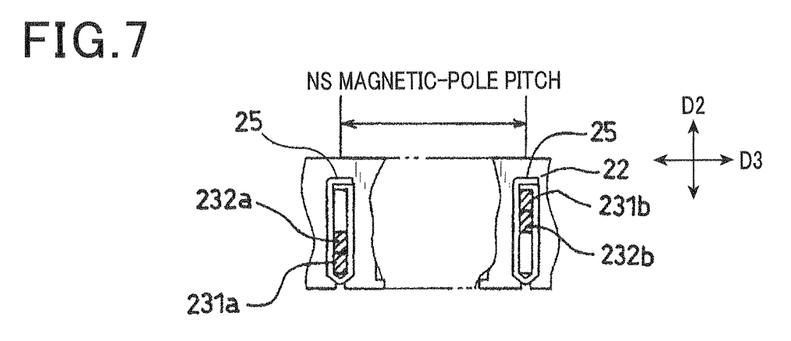
FIG. 7 is a partial cross-sectional view of the stator for explaining the slots of the stator core that house the conductor segments according to the first embodiment.

A single electrical conductor within one slot 25 forms a pair with another single electrical conductor within another slot 25. The slots 25 are apart by a predetermined magnetic-pole pitch. For example, as shown in FIG. 7, an electrical conductor 231a of the inner end layer in one slot 25 forms a pair with an electrical conductor 231b of the outer end layer in another slot 25 that is apart from the one slot 25 by a single magnetic-pole pitch (NS pole pitch) in the clockwise direction of the stator core 22. In a similar manner, an electrical conductor 232a of the inner middle layer in the one slot 25 forms a pair with an electrical conductor 232b of the outer middle layer in the other slot 25 that is apart from the one slot 25 by a single magnetic-pole pitch in the clockwise direction of the stator core 22.

The electrical conductors that form a pair, or in other words, the electrical conductor 231a of the inner end layer and the electrical conductor 231b of the outer end layer are connected via the turn portion 23h (231c) in the turn-side end portion 23b on the one axial-direction end side of the stator core 22. In addition, the electrical conductor 232a of the inner middle layer and the electrical conductor 232b of the outer middle layer are connected via the turn portion 23h (232c).

In other words, in the turn-side end portion 23b on the one axial-direction end side of the stator core 22, the electrical conductor 231a of the inner end layer and the electrical conductor 232a of the inner middle layer in the one slot 25 extend from the slot 25 in the clockwise direction of the stator core 22. In addition, the electrical conductor 231b of the outer end layer and the electrical conductor 232b of the outer middle layer in the other slot 25 extend from the slot 25 in the counter-clockwise direction of the stator core 22.

On the other hand, the electrical conductor 232a of the inner middle layer in the one slot 25 also forms a pair with an electrical conductor 231a' of the inner end layer in the other slot 25 that is apart from the one slot 25 by a single magnetic-pole pitch in the clockwise direction of the stator core 22. In a similar manner, the electrical conductor 231b' of the outer end layer in the one slot 25 also forms a pair with the electrical conductor 232b of the outer middle layer in the other slot 25 that is apart from the one slot 25 in the clockwise direction of the stator core 22.

In the joined-side end portion 23c on the other axial-direction end side of the stator core 22, the electrical conductors that form a pair, or in other words, the electrical conductor 232a of the inner middle layer and the electrical conductor 231a' of the inner end layer are connected by the joined end portions 23f (232d and 231d') being joined together (see FIG. 4). In addition, the electrical conductor 231b' of the outer end layer and the electrical conductor 232b of the outer middle layer are connected by the joined end portions 23f (231e' and 232e) being joined together (see FIG. 4).

In other words, in the turn-side end portion 23b on the one axial-direction end side of the stator core 22, the electrical conductor 231a of the inner end layer and the electrical conductor 232b of the outer middle layer in the one slot 25 extend from the slot 25 in the counter-clockwise direction of the stator core 22. In addition, the electrical conductor 232a of the inner middle layer and the electrical conductor 231b of the outer end layer in the one slot 25 extend from the slot 25 in the clockwise direction of the stator core 22.

Furthermore, as shown in FIG. 3, the electrical conductor 231a of the inner end layer and the electrical conductor 231b of the outer end layer are provided by a large segment 231. The large segment 231 is formed by a series of conductors being shaped into a substantially U-shape. The electrical conductor 232a of the inner middle layer and the electrical conductor 232b of the outer middle layer are provided by a small segment 232. The small segment 232 is formed by a series of conductors being shaped into a substantially U-shape. The basic substantially U-shaped conductor segment 23 is configured by the large segment 231 and the small segment 232.

The above-described configuration is repeated for the basic conductor segments 23 of all slots 25. For each phase of the stator winding 21, a winding (coil) is formed by the basic conductor segments 23. The winding is wound around the stator core 22 twice for each phase. However, for each phase of the stator winding 21, a segment integrally having an output lead line and a neutral-point lead line and a segment having the turn portion 23h that connects the first round and the second round of the winding around the stator core 22 are configured by deformed segments differing from the basic conductor segment 23. The winding ends of the phases of the stator winding 21 are connected by star connection using the deformed segments.

The insulating sheet member 24 is disposed in each slot 25 of the stator core 22 along the inner wall surface of the slot 25. The insulating sheet member 24 is formed by a rectangular insulating paper being rolled into a rectangular cylindrical shape that matches the cross-sectional shape of the slot 25 in the direction perpendicular to the axis. The insulating sheet member 24 is formed slightly longer than the axial-direction length of the slot 25. The insulating sheet member 24 is disposed such that each axial-direction end portion projects outside of the slot 25 from both axial-direction end surfaces of the stator core 22 (see FIG. 2 and FIG. 3).

The insulating sheet member 24 is rolled into the rectangular cylindrical shape. The insulating sheet member 24 has an overlapping portion 24a in which both circumferential-direction end portions overlap each other. The insulating sheet member 24 is disposed such that the overlapping portion 24a is positioned on the outer-diameter side of the slot 25. A slack portion 24b is provided on the side opposite to the overlapping portion 24a of the insulating sheet member 24 in the radial direction D2 (the inner-diameter side of the slot 25). The slack portion 24b is formed such that the insulating sheet member 24 is bent to form a substantially V-shaped cross-section such as to project towards the inner-diameter side. As a result, a gap portion is formed between the electrical conductor 231a that is furthest toward the inner diameter side within the slot 25 and the slack portion 24b. The insulating sheet member 24, disposed as described above, provides electrical insulation between the four electrical conductors (slot-housed portions 23a) housed in the slot 25 and the inner wall surface of the slot 25.

The insulating sheet member 24 is disposed within each slot 25 before the joined end portions 23f of the plurality of conductor segments 23 inserted into the slots 25 are joined together and the stator winding 21 is wound around the stator core 22. Thereafter, the pair of joined-side end portions 23c of the conductor segments 23 that have been inserted into the slots 25 from one axial-direction side and are projecting towards the other axial-direction side are twisted towards opposite sides in the circumferential direction D3. As a result, the oblique portions 23e are formed. At this time, the inner diameter side of the end portion on the other axial-direction side of the insulating sheet member 24 projecting from the end surface on the other axial-direction side of the stator core 22 is pressed by the oblique portion 23e.

Figure 8A:
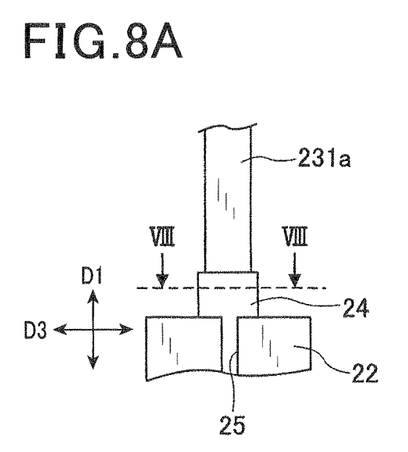
FIG. 8A is a front view, viewed from a radial-direction inner-diameter side, that shows a state before an open end portion of the conductor segment is twisted in a circumferential direction according to the first embodiment.
Figure 8B:
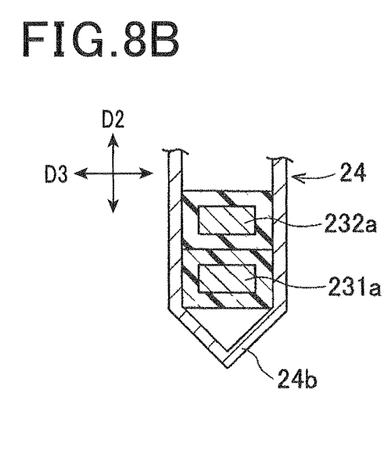
FIG. 8B is a cross-sectional view taken along line VIII-VIII in FIG. 8A.
Figure 9A:
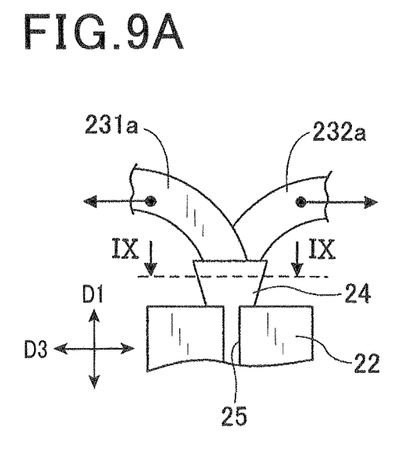
FIG. 9A is a front view, viewed from a radial-direction inner-diameter side, that shows a state after the open end portion of the conductor segment is twisted in the circumferential direction according to the first embodiment.
Figure 9B:
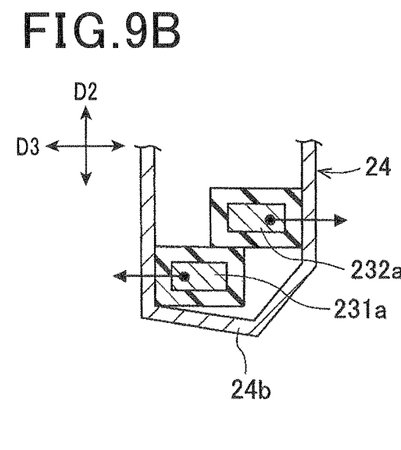
FIG. 9B is a cross-sectional view taken along line IX-IX in FIG. 9A.

At this time, as shown in FIG. 8A and FIG. 8B, on the inner diameter side of the slot 25, the electrical conductor 231a of the inner end layer extends from the slot 25 towards the counter-clockwise direction of the stator core 22. The electrical conductor 232a of the inner middle layer extends from the slot 25 towards the clockwise direction of the stator core 22. Therefore, the inner diameter side of the end portion on the other axial-direction side of the insulating sheet member 24 is pulled toward both circumferential-direction sides, as shown in FIG. 9A and FIG. 9B. However, because the slack portion 24b that extends in the circumferential direction D3, stretching stress in the circumferential direction D3 applied on the end portion on the other axial-direction side of the insulating sheet member 24 can be relaxed. As a result, tearing of the end portion on the other axial-direction side of the insulating sheet member 24 does not occur.

On the outer diameter side of the slot 25, the end portion on the other axial-direction side of the insulating sheet member 24 is pressed by the two oblique portions 23e. The two oblique portions 23e are formed by being twisted to the opposite sides in the circumferential direction D3. At this time, as a result of the overlapping portions 24a being misaligned from each other in the circumferential direction D3, stretching stress is not applied. Tearing of the insulating sheet member 24 does not occur.

As described above, among the oblique portions 23e of the conductor segments 23 extending from the slots 25 towards the other axial-direction side, the joined end portions 23f of predetermined oblique portions 23e are joined together by welding (the terminals are joined together). As a result, the plurality of conductor segments 23 are connected in a predetermined state. As a result, the three-phase stator winding 21 that is wound around the slots 25 of the stator core 22 is formed.

Then, the plurality of conductor segments 23 housed within the slots 25 of the stator core 22 are fixed together by an adhesive material 26, such as varnish (the slot-housed portions 23a are fixed together). The adhesive material 26 is dripped towards the gap portion formed inside the insulating sheet member 24. At this time, the gap portion is formed by the slack portion 24b of the insulating sheet member 24 within the slot 25. Therefore, the adhesive member 26 easily enters the inside of the insulating sheet member 24. The stator winding 21 can be easily fixed. In addition, the dripped adhesive member 26 is hardened. As a result, the slot 25 becomes impregnable against foreign matter infiltrating the slot 25 from the opening portion 25a on the inner diameter side. Damage to the insulating film of the conductor segment 23 can be prevented.

In the stator 2 according to the first embodiment, configured as described above, the insulating sheet member 24 is interposed between the inner wall surface of the slot 25 and the electrical conductors (slot-housed portions 23a). The insulating sheet member 24 has the slack portion 24b that is provided on the side opposite to the overlapping portion 24a in the radial direction D2 (inner diameter side). Therefore, when the open end portions of the conductor segment 23 extending towards the other axial-direction end side from the slot 25 are twisted in the circumferential direction D3, the slack portion 24b extends in the circumferential direction D3. Therefore, stretching stress in the circumferential direction D3 applied to the axial-direction end portion of the insulating sheet member 24 projecting from the axial-direction end surface of the stator core 22 can be relaxed. As a result, tearing of the insulating sheet member 24 can be prevented. Furthermore, the straight portion that extends in the axial direction D1 and is present at the base of the twist in the open end portion extending from the slot 25 towards the other axial-direction end side can be made smaller. Therefore, size reduction of the stator winding 21 can be actualized.

In addition, the insulating sheet member 24 according to the first embodiment is disposed such that the slack portion 24b is positioned on the opening portion 25a side (inner diameter side) of the slot 25. Therefore, the slack portion 24b can absorb impact from foreign matter that collides from the inner diameter side of the stator core 22. As a result, damage to the insulating film of the conductor segment 23 caused by collision with foreign matter can be prevented.

In addition, the plurality of electrical conductors (slot-housed portions 23a) housed within the slots 25 are fixed together by the adhesive material 26. The adhesive member 26 is dripped towards the slack portion 24b. Therefore, the adhesive material 26 can easily enter the inside of insulating sheet member 24 from the gap portion present in the slack portion 24b. The stator winding 21 can be easily fixed. In addition, the adhesive material 26 that is dripped towards the slack portion 24b is hardened. As a result, the slot 25 becomes impregnable against foreign matter infiltrating the slot 25 from the opening portion 25a on the inner diameter side. As a result, damage to the insulating film of the conductor segment 23 can be prevented with further certainty.

First Variation Example

According to the above-described first embodiment, the slack portion 24b provided in the insulating sheet member 24 is formed such that the insulating sheet member 24 is bent to form a substantially V-shaped cross-section such as to project towards the inner-diameter side. However, a slack portion 24c may be formed as in a first variation example shown in FIG. 10. In the slack portion 24c, the insulating sheet member 24 is bent to form a substantially U-shaped cross-section such as to project towards the inner diameter side.

Figure 10:
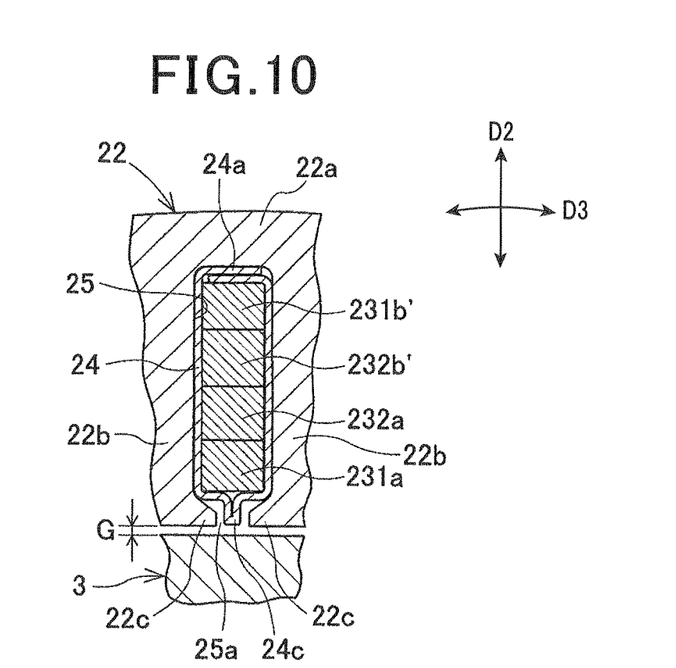
FIG. 10 is a partial cross-sectional view of the stator in a first variation example.

As a result, compared to the slack portion 24b forming the V-shaped cross-section according to the first embodiment, the length of the slack portion 24c in the circumferential direction D3 can be made longer. Therefore, extension in the circumferential direction D3 can be increased.

Second Variation Example

Figure 11:
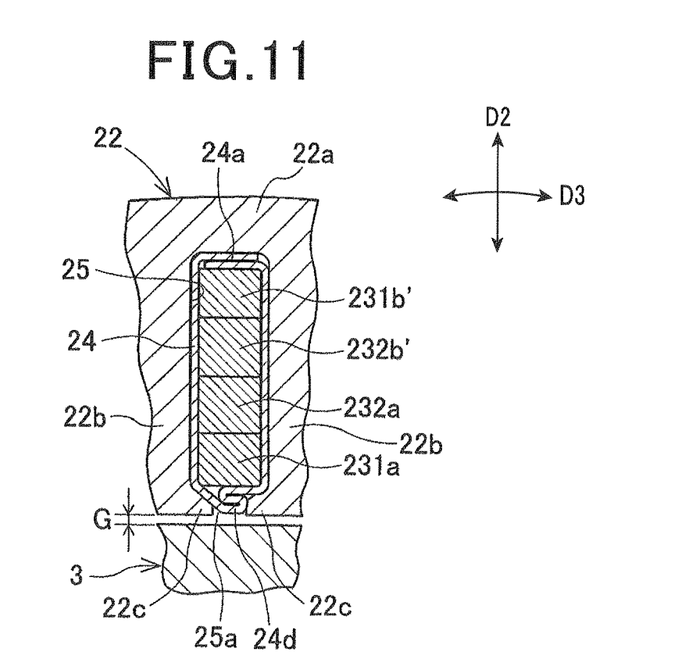
FIG. 11 is a partial cross-sectional view of the stator in a second variation example.

Instead of the above-described slack portion 24b according to the first embodiment, a slack portion 24d may be formed as in a second variation example shown in FIG. 11. In the slack portion 24d, the insulating sheet member 24 is formed into a bellows-like shape by being folded twice or more. As a result, the length of the slack portion 24d can be made even longer than that of the slack portion 24c forming the U-shaped cross-section in the first variation example. Therefore, extension in the circumferential direction D3 can be further increased.

Second Embodiment

The basic configuration of a stator 2 for a rotating electrical machine according to a second embodiment is the same as that according to the first embodiment. The shape of the slot 25 provided in the stator 22 differs from that according to the first embodiment. In addition, the manner in which the insulating sheet member 24 is disposed also differs from that according to the first embodiment. Therefore, detailed descriptions of components and configurations that are shared with the first embodiment will be omitted. Differences and important points will hereinafter be described. Other than components and sections differing from those according to the first embodiment, components and sections that are shared with the first embodiment are given the same reference numbers.

Figure 12:
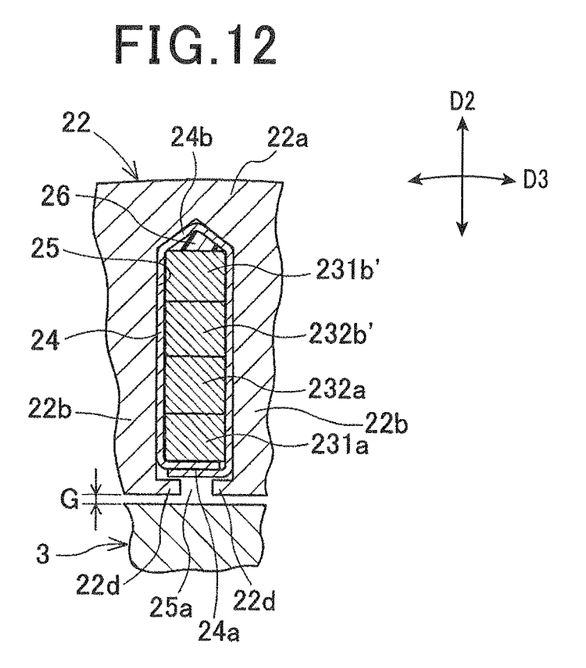
FIG. 12 is a partial cross-sectional view of a stator according to a second embodiment.

The plurality of slots 25 are provided in the stator core 22. As shown in FIG. 12, each slot 25 is formed such that the inner wall surface on the outer diameter side is bent to form a V-shaped cross-section such as to project towards the outer diameter side. A flange portion 22d is formed at the projecting tip of each of the two teeth portions 22b demarcating the slot 25. The flange sections 22d oppose each other with a predetermined distance therebetween in the circumferential direction D3. The radial-direction width of the flange portion 22d is substantially fixed. In other words, the slot 25 according to the second embodiment is formed such that the cross-sectional shape is opposite in the radial direction D2 to that of the slot 25 according to the first embodiment.

The insulating sheet member 24 according to the second embodiment is formed by a rectangular insulating paper being rolled into a rectangular cylindrical shape that matches the cross-sectional shape of the slot 25 in the direction perpendicular to the axis. The insulating sheet member 24 is disposed along the inner wall surface of the slot 25. The insulating sheet member 24 also has the overlapping portion 24a in which both circumferential-direction end portions overlap each other. The slack portion 24b is provided on the side opposite to the overlapping portion 24a in the radial direction D2. The slack portion 24b is formed such that the insulating sheet member 24 is bent to form a substantially V-shaped cross-section such as to project towards the outer-diameter side.

In other words, the insulating sheet member 24 according to the second embodiment has a configuration similar to that of the insulating sheet member 24 according to the first embodiment. However, the insulating sheet member 24 according to the second embodiment differs from that according to the first embodiment in that the insulating sheet member 24 according to the second embodiment is disposed such that the overlapping portion 24a is positioned on the inner diameter side (opening portion 25a side) of the slot 25. The slack portion 24b is positioned on the outer diameter side of the slot 25.

In the stator 2 according to the second embodiment configured as described above, the insulating sheet member 24 has the slack portion b that is provided on the side opposite to the overlapping portion 24a in the radial direction (the outer diameter side). Therefore, operations and effects similar to those according to the first embodiment can be achieved. In other words, for example, tearing of the insulating sheet member 24 disposed in the slot 25 of the stator core 22 can be prevented while reducing the size of the stator winding 21.

Third Variation Example

According to the above-described second embodiment, the slack portion 24b provided in the insulating sheet member 24 is formed such that the insulating sheet member 24 is bent to form a substantially V-shaped cross-section such as to project towards the outer-diameter side. However, the slack portion 24c may be formed as in a third variation example shown in FIG. 13. In the slack portion 24c, the insulating sheet member 24 is bent to form a substantially U-shaped cross-section such as to project towards the outer diameter side.

Figure 13:
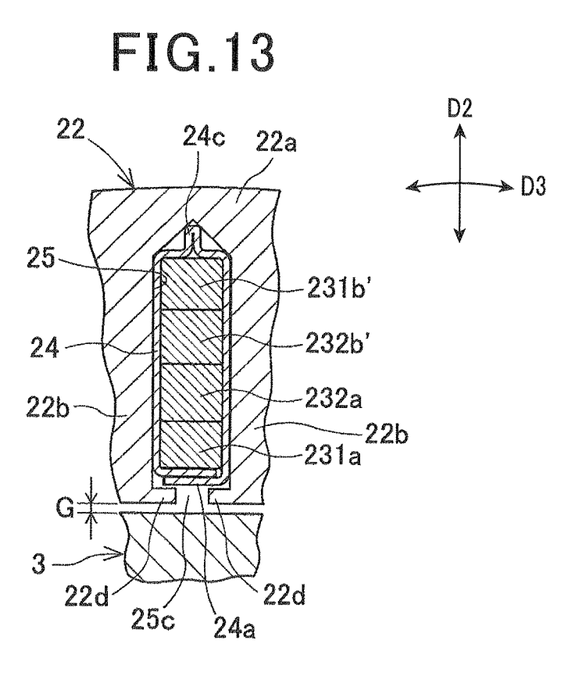
FIG. 13 is a partial cross-sectional view of the stator in a third variation example.

As a result, compared to the slack portion 24b forming the V-shaped cross-section according to the second embodiment, the length of the slack portion 24c in the circumferential direction D3 can be made longer. Therefore, extension in the circumferential direction D3 can be increased.

Fourth Variation Example

Figure 14:
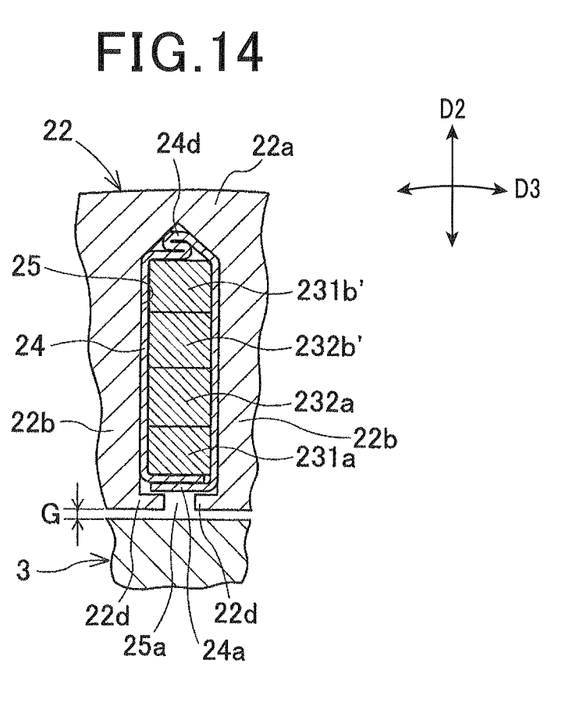
FIG. 14 is a partial cross-sectional view of the stator in a fourth variation example.

Instead of the above-described slack portion 24b according to the second embodiment, the slack portion 24d may be formed as in a fourth variation example shown in FIG. 14. In the slack portion 24d, the insulating sheet member 24 is formed into a bellows-like shape by being folded twice or more. As a result, the length of the slack portion 24d can be made even longer than that of the slack portion 24c forming the U-shaped cross-section in the third variation example. Therefore, extension in the circumferential direction D3 can be further increased.

OTHER EMBODIMENTS

The present invention is not limited to the above-described first and second embodiments. Various modifications can be made without departing from the spirit of the present invention. For example, an insulating paper is used as the insulating sheet member 24 according to the first and second embodiments. However, a plastic sheet, a ceramic sheet, a combined sheet in which the plastic sheet and the ceramic sheet are laminated, and the like can be used instead.

In addition, according to the above-described first and second embodiments, an example is described in which the stator for a rotating electrical machine of the present invention is applied to an alternating-current generator for a vehicle. However, the present invention can also be applied to a power generator, an electric motor, or a rotating electrical machine that can be selectively used as both, as the rotating electrical machine that is mounted in a vehicle.

What is claimed is:

1. A stator for a rotating electrical machine, comprising:
an annular stator core in which a plurality of slots are formed to be arrayed in a circumferential direction of the stator core;
a stator winding that comprises a plurality of conductor segments having oblique portions formed by open end portions of the conductor segments being twisted in the circumferential direction, the open end portions being inserted into the slots from one of two axial-direction sides of the stator core and extending towards another one of the two axial-direction side of the stator core, and terminals of the oblique portions being joined to one another; and
an insulating sheet member that is interposed between an inner wall surface of each of the slots and each of the conductor segments,
the insulating sheet member is one sheet that is rolled into a cylindrical shape along the inner wall surface of each of the slots, the cylindrical shape extending out of the slots,
each of the slots including
a first portion that houses the conductor segments therein,
a second portion that has a V-shaped cross section that narrows to have a circumferential distance between adjacent surfaces narrower than the circumferential width of each of the conductor segments, that provides a V-shaped space between a nearest conductor segment and the V-shaped cross section when the conductor segments are at a most radially inward or outward position, and that communicates with one of two radial-direction sides of the first portion, and
an opening portion that communicates with an inner-diameter side of two radial direction sides with respect to the first portion and the second portion, and has an opening width that is smaller than a width of each of the conductor segments,
the insulating sheet member including
an overlapping portion in which two circumferential-direction end portions of the insulating sheet member overlap each other, the overlapping portion being disposed on the other of the two radial-direction sides of the first portion, and a slack portion that is disposed opposite the overlapping portion and that is bent to include a substantially U-shaped cross-section that projects in the radial direction away from a radial-direction end surface of the conductor segments, the slack portion being housed in the second portion of each of the slots, wherein a cross-sectional area of the second portion of each of the slots is approximately equal to or larger than a cross-sectional area of the slack portion of the insulating sheet member.

2. The stator according to claim 1, wherein the plurality of conductor segments housed within the slots are fixed together by an adhesive material that is dripped towards the slack portion.

3. The stator according to claim 2, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

4. The stator according to claim 3, further comprising:
an adhesive member that is dripped towards the slack portion and is hardened.

5. The stator according to claim 2, wherein:
each of the slots includes a slit-shaped opening that opens on the inner circumferential surface of the stator core at one of the two radial-direction sides of each of the slots; and
the insulating sheet member is disposed such that the slack portion is located on another one of the two radial-direction sides of each of the slots.

6. The stator according to claim 1, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

7. The stator according to claim 6, further comprising:
an adhesive member that is dripped towards the slack portion and is hardened.

8. The stator according to claim 1, wherein:
each of the slots includes a slit-shaped opening that opens on the inner circumferential surface of the stator core at one of the two radial-direction sides of each of the slots; and
the insulating sheet member is disposed such that the slack portion is located on another one of the two radial-direction sides of each of the slots.

9. A stator for a rotating electrical machine, comprising:
an annular stator core in which a plurality of slots are formed to be arrayed in a circumferential direction of the stator core;
a stator winding that comprises a plurality of conductor segments having oblique portions formed by open end portions of the conductor segments being twisted in the circumferential direction, the open end portions being inserted into the slots from one of two axial-direction sides of the stator core and extending towards another one of the two axial-direction side of the stator core, and terminals of the oblique portions being joined to one another; and
an insulating sheet member that is interposed between an inner wall surface of each of the slots and each of the conductor segments,
the insulating sheet member is one sheet that is rolled into a cylindrical shape along the inner wall surface of each of the slots, the cylindrical shape extending out of the slots,
each of the slots including
a first portion that houses the conductor segments therein,
a second portion that has a V-shaped cross section that narrows to have a circumferential distance between adjacent surfaces narrower than the circumferential width of each of the conductor segments, that provides a V-shaped space between a nearest conductor segment and the V-shaped cross section when the conductor segments are at a most radially inward or outward position, and that communicates with one of two radial-direction sides of the first portion, and
an opening portion that communicates with an inner-diameter side of two radial direction sides with respect to the first portion and the second portion, and has an opening width that is smaller than a width of each of the conductor segments,
the insulating sheet member including
an overlapping portion in which two circumferential-direction end portions of the insulating sheet member overlap each other, the overlapping portion being disposed on the other of the two radial-direction sides of the first portion, and
a slack portion that is disposed opposite the overlapping portion and that is folded at least twice into a bellows-like shape that projects in the radial direction away from a radial-direction end surface of the conductor segments, the slack portion being housed in the second portion of each of the slots,
wherein a cross-sectional area of the second portion of each of the slots is approximately equal to or larger than a cross-sectional area of the slack portion of the insulating sheet member.

10. The stator according to claim 9, wherein the plurality of conductor segments housed within the slots are fixed together by an adhesive material that is dripped towards the slack portion.

11. The stator according to claim 10, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

12. The stator according to claim 11, further comprising:
an adhesive member that is dripped towards the slack portion and is hardened.

13. The stator according to claim 10, wherein:
each of the slots includes a slit-shaped opening that opens on the inner circumferential surface of the stator core at one of the two radial-direction sides of each of the slots; and the insulating sheet member is disposed such that the slack portion is located on another one of the two radial-direction sides of each of the slots.

14. The stator according to claim 9, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

15. The stator according to claim 14, further comprising:
an adhesive member that is dripped towards the slack portion and is hardened.

16. The stator according to claim 9, wherein:
each of the slots includes a slit-shaped opening that opens on the inner circumferential surface of the stator core at one of the two radial-direction sides of each of the slots; and
the insulating sheet member is disposed such that the slack portion is located on another one of the two radial-direction sides of each of the slots.

17. A stator for a rotating electrical machine, comprising:
an annular stator core in which a plurality of slots are formed to be arrayed in a circumferential direction of the stator core;
a stator winding that comprises a plurality of conductor segments having oblique portions formed by open end portions of the conductor segments being twisted in the circumferential direction, the open end portions being inserted into the slots from one of two axial-direction sides of the stator core and extending towards another of the two axial-direction sides of the stator core, and terminals of the oblique portions being joined to one another; and
an insulating sheet member that is interposed between an inner wall surface of each of the slots and each of the conductor segments,
the insulating sheet member being one sheet that is rolled into a cylindrical shape along the inner wall surface of each of the slots, the cylindrical shape extending out of the slots,
each of the slots including
a first portion that houses the conductor segments therein,
a second portion that has a V-shaped cross section that narrows to have a circumferential distance between adjacent surfaces narrower than the circumferential width of each of the conductor segments, that provides a V-shaped space between a nearest conductor segment and the V-shaped cross section when the conductor segments are at a most radially inward or outward position, and that communicates with one of two radial-direction sides of the first portion, and
an opening portion that communicates with an inner-diameter side of two radial direction sides with respect to the first portion and the second portion, and has an opening width that is smaller than a width of each of the conductor segments,
the insulating sheet member including
an overlapping portion in which two circumferential-direction end portions of the insulating sheet member overlap each other, the overlapping portion being disposed on the other of the two radial-direction sides of the first portion, and
a slack portion that is disposed opposite the overlapping portion and that is bent into a second V-shaped cross-section that projects in the radial direction away from a radial-direction end surface of the conductor segments, the slack portion being housed in the second portion of each of the slots,
wherein a cross-sectional area of the second portion of each of the slots is approximately equal to or larger than a cross-sectional area of the slack portion of the insulating sheet member.

18. The stator according to claim 17, wherein
the plurality of conductor segments housed within the slots are fixed together by an adhesive material that is dripped towards the slack portion.

19. The stator according to claim 18, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

20. The stator according to claim 19, further comprising:
an adhesive member that is dripped towards the slack portion and is hardened.

21. The stator according to claim 18, wherein:
each of the slots includes a slit-shaped opening that opens on the inner circumferential surface of the stator core at one of the two radial-direction sides of each of the slots; and
the insulating sheet member is disposed such that the slack portion is located on another one of the two radial-direction sides of each of the slots.

22. The stator according to claim 17, wherein:
each of the slots includes a slit-shaped opening that opens on the inner circumferential surface of the stator core at one of the two radial-direction sides of each of the slots; and
the insulating sheet member is disposed such that the slack portion is positioned on the one of the two radial-direction sides of each of the slots on which the opening portion is positioned.

23. The stator according to claim 22, further comprising:
an adhesive member that is dripped towards the slack portion and is hardened.

24. The stator according to claim 17, wherein:
each of the slots includes a slit-shaped opening that opens on the inner circumferential surface of the stator core at one of the two radial-direction sides of each of the slots; and
the insulating sheet member is disposed such that the slack portion is located on another one of the two radial-direction sides of each of the slots.

25. A rotating electrical machine, comprising:
a housing;
a rotary shaft that is supported by the housing;
a rotor that rotates integrally with the rotary shaft;
a stator that is disposed on an outer-circumference side of the rotor,
the stator including:
an annular stator core in which a plurality of slots are formed to be arrayed in a circumferential direction of the stator core;
a stator winding that comprises a plurality of conductor segments having oblique portions formed by open end portions of the conductor segments being twisted in the circumferential direction, the open end portions being inserted into the slots from one of two axial-direction sides of the stator core and extending towards another of the two axial-direction sides of the stator core, and terminals of the oblique portions being joined to one another; and an insulating sheet member that is interposed between an inner wall surface of each of the slots and each of the conductor segments, the insulating sheet member being one sheet that is rolled into a cylindrical shape along the inner wall surface of each of the slots, the cylindrical shape extending out of the slots, each of the slots including
- a first portion that houses the conductor segments therein,
- a second portion that has a V-shaped cross section that narrows to have a circumferential distance between adjacent surfaces narrower than the circumferential width of each of the conductor segments, that provides a V-shaped space between a nearest conductor segment and the V-shaped cross section when the conductor segments are at a most radially inward or outward position, and that communicates with one of two radial-direction sides of the first portion, and
- an opening portion that communicates with an inner-diameter side of two radial direction sides with respect to the first portion and the second portion, and has an opening width that is smaller than a width of each of the conductor segments, the insulating sheet member including
- an overlapping portion in which two circumferential-direction end portions of the insulating sheet member overlap each other, the overlapping portion being disposed on the other of the two radial-direction sides of the first portion, and
- a slack portion that is disposed opposite the overlapping portion and that is bent into a second V-shaped cross-section that projects in the radial direction away from a radial-direction end surface of the conductor segments, the slack portion being housed in the second portion of each of the slots, wherein a cross-sectional area of the second portion of each of the slots is approximately equal to or larger than a cross-sectional area of the slack portion of the insulating sheet member.

26. The rotating electrical machine according to claim 25, wherein the plurality of conductor segments housed within the slots are fixed together by an adhesive material that is dripped towards the slack portion.

27. The rotating electrical machine according to claim 26, wherein:

each of the slots includes a slit-shaped opening that opens on the inner circumferential surface of the stator core at one of the two radial-direction sides of each of the slots; and the insulating sheet member is disposed such that the slack portion is positioned on the one of the two radial-direction sides of each of the slots on which the opening portion is positioned.

28. The rotating electrical machine according to claim 27, wherein the stator further includes an adhesive member that is dripped towards the slack portion and is hardened.

29. The rotating electrical machine according to claim 25, wherein:

each of the slots includes a slit-shaped opening that opens on the inner circumferential surface of the stator core at one of the two radial-direction sides of each of the slots; and the insulating sheet member is disposed such that the slack portion is located on another one of the two radial-direction sides of each of the slots.

* * * * *